United States Patent
Duchesneau et al.

[15] 3,668,349
[45] June 6, 1972

[54] PROPORTIONAL PRESSURE DIFFERNCE ACTUATOR

[72] Inventors: Jerome G. Duchesneau, Andover; Robert A. Schwartz, Vernon, both of, Conn.

[73] Assignee: United Aircraft Corporation, East Hartford, Conn.

[22] Filed: Mar. 12, 1971

[21] Appl. No.: 123,507

[52] U.S. Cl. ..................................200/82 R, 92/62, 92/75
[51] Int. Cl. ....................................H01h 35/38, F01b 7/04
[58] Field of Search ..................200/82 R, 82 A, 82 C, 82 D, 200/82 DA, 83 A; 92/61, 75, 62, 65; 73/419, 205 R, 208, 239; 251/62

[56] References Cited

UNITED STATES PATENTS

| | | | |
|---|---|---|---|
| 3,312,146 | 4/1967 | Quere et al. | 92/62 X |
| 3,372,256 | 3/1968 | Ryskamp | 200/82 C |
| 3,463,554 | 8/1969 | Bueler | 200/82 D X |

FOREIGN PATENTS OR APPLICATIONS

| | | | |
|---|---|---|---|
| 1,279,057 | 2/1961 | France | 92/61 |

Primary Examiner—Robert K. Schaefer
Assistant Examiner—Robert A. Vanderhye
Attorney—Norman Friedland

[57] ABSTRACT

Actuation of a pressure actuator is manifested solely when the pressures from two separate systems exceed a predetermined differential or the absence of pressure is evidenced by including a piston having one face sensitive to one of the pressures and the opposing face sensitive to the other pressure, and a pair of smaller pistons slidably mounted on connecting shaft of the piston, each having a face adapted to subtract a force from the total force when the pressure acting on one face of the sensing piston is at a predetermined value. The piston is spring loaded in an actuating position when no pressure is acting on the piston.

7 Claims, 2 Drawing Figures

PATENTED JUN 6 1972 3,668,349

INVENTORS
JEROME G. DUCHESNEAU
ROBERT A. SCHWARTZ

BY Norman Friedland
ATTORNEY

PROPORTIONAL PRESSURE DIFFERNCE ACTUATOR

BACKGROUND OF THE INVENTION

This invention relates to a pressure sensor and particularly to a pressure sensor responding solely when the pressure differential between two sensed pressures reaches a predetermined value and when the absence of pressure is evidenced.

Conventional pressure sensor actuators are usually designed to be actuated when a predetermined pressure has been obtained. These heretofore known devices, however, do not afford the capability of ascertaining when the differential pressure of two separate systems have been achieved without going through complicated mechanisms for computing the pressures of the systems intended to be measured independently and having additional mechanism for comparing the computed pressures. I have found that I can provide a relatively simple pressure sensing system that senses the pressures in two independent systems and indicates when a predetermined pressure differential between the two systems has been obtained. Thus, if a pressure falloff in one of the systems has been evidenced, the pressure sensor will actuate and indicate when this condition has occurred. For example, the system can be employed to actuate a switch which, in turn, can turn on a light which is visible to show that the pressure in one of the systems has fallen off. This is particularly advantageous in a dual hydraulic system for aircraft where it is desirable to indicate to the operator that a system failure has occurred. By spring loading the piston to actuate when no pressure is evidenced, it is also possible to obtain a signal indicative of the fact that no pressure is evident in both of the systems intended to be measured.

SUMMARY OF INVENTION

The primary object of the invention is to provide an improved pressure sensor.

In accordance with the present invention, a piston is disposed in a chamber having opposed reaction surfaces each of which sense the pressure intended to be measured. A connecting rod extending from each of the surfaces carries smaller diameter pistons mounted in sliding relationship subtracting a predetermined force indicative of the differential necessary to indicate when a failure has occurred.

Another feature of this invention is to provide means for indicating when no pressure is evidenced in this system by spring loading the piston in a particular direction so that it will be actuated upon evidencing the absence of any pressures.

A still further object is to provide a pressure differential sensing mechanism for indicating when a failure occurs which is characterized by being simple and relatively inexpensive to manufacture.

Other features and advantages will be apparent from the specification and claims and from the accompanying drawings which illustrate an embodiment of the invention.

While the invention in its preferred embodiment was designed to produce a visual indication whenever either of two hydraulic system in a propeller for an aircraft was not providing sufficient operating pressure, it is to be understood and appreciated by one skilled in the art that this invention has applications whenever it is desired to sense a dual hydraulic system, noting that it is not essential to the invention to actuate an indicator light. Rather, it is deemed within the scope of this invention to produce an output signal indicative of when no pressures are applied to the sensor and/or when a predetermined pressure differential between the two systems being measured is evidenced. Thus, in the embodiment described hereinbelow at a static ground condition the indicator light will be on signifying no pressure and that during starting when sufficient pressure is reached by both propeller pumps (not shown), the indicator light can be observed to go out thereby demonstrating that the indicator system is functioning and the pumps of each system are functioning.

Figure 1:
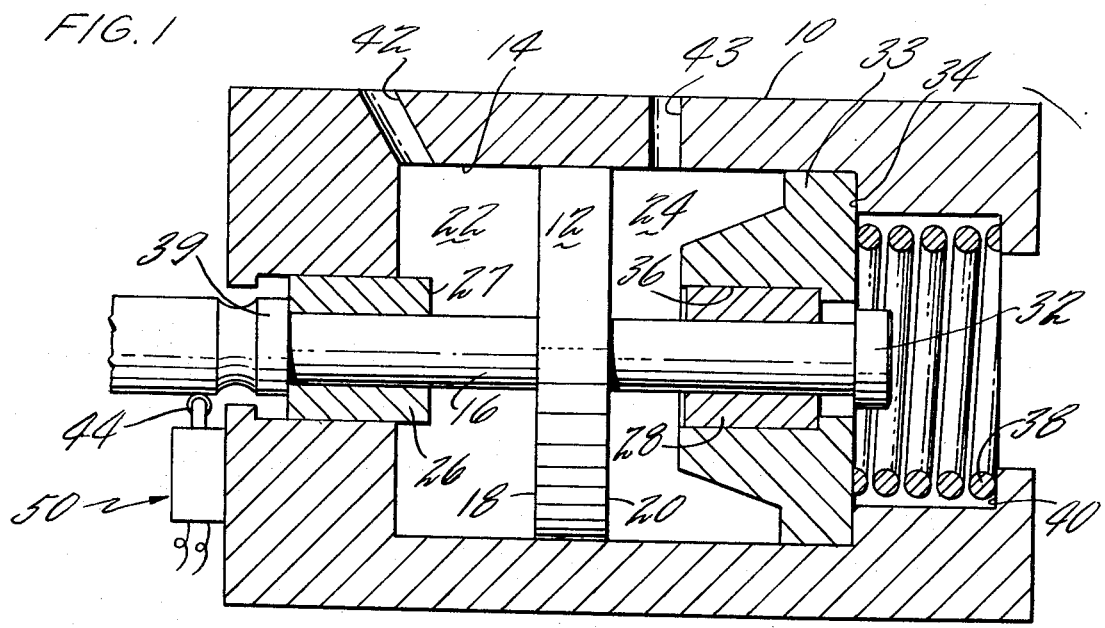
FIG. 1 is a side elevation partly in section illustrating the details of the invention.
Figure 2:
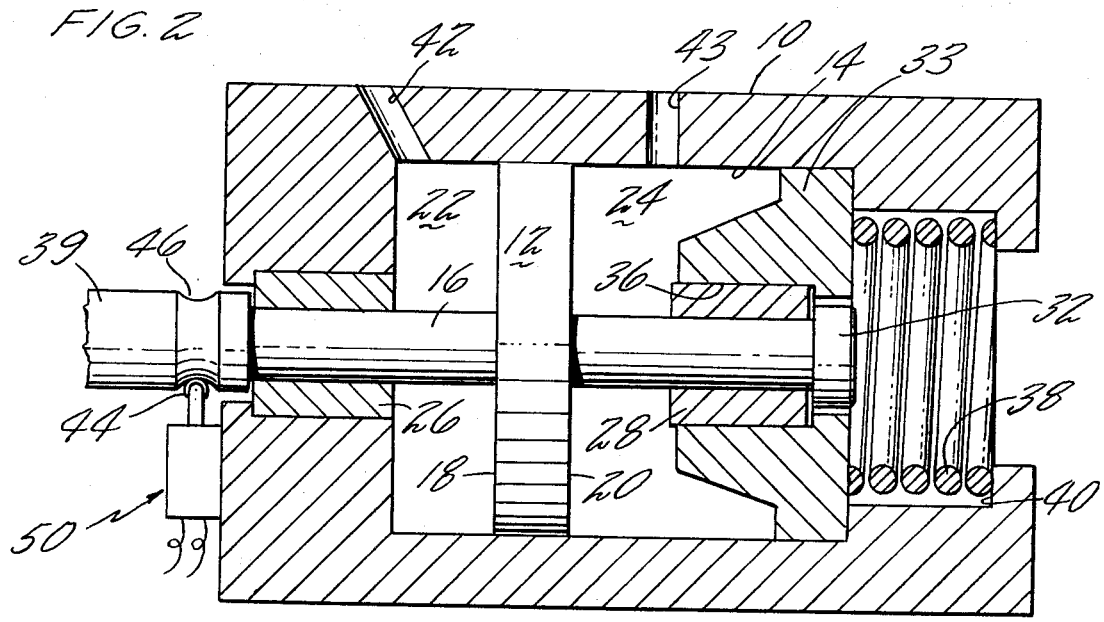
FIG. 2 is a side elevation partly in section indicating when the pressure sensor is in the deactuating position.

Referring to FIGS. 1 and 2, the preferred embodiment consists of a casing 10 supporting piston 12 within chamber 14. Connecting rod 16, which may be a unitary member centrally disposed in the casing and extending from reaction surfaces 18 and 20, projects through the reaction chambers 22 and 24. A pair of smaller diameter pistons 26 and 28 are slidably mounted on connecting rod 16 and are capable of travel between the confines of the piston reaction surface 18 and the larger diameter camming extension 39 and piston reaction surface 20 and the end nut 32 respectively. Plunger 33 slidably mounted in chamber 24 abuts against shoulder 34 formed in the inner diameter of casing 10. The inner diameter 36 of plunger 33 is slightly greater than the outer diameter of piston 28 to provide relative movement therebetween. Spring 38 grounded against flange 40 formed at one end of casing 10 biases the plunger 33 leftwardly. Pressure being sensed by the two separate systems is admitted into chambers 22 and 24 respectively via inlets 42 and 43.

When there is no hydraulic pressure from either system, the spring force manifested by spring 38 moves plunger 33 leftwardly contacting piston 12 forcing it leftwardly from moving the switch actuator and roller mechanism 44 out of the detent 46 formed on the camming extension 39. This actuates the microswitch indicated in blank and identified as reference numeral 50 to the on position.

The actuator is shown in the deactuating position in FIG. 2 wherein the roller 44 is located in the detent 46. In this position the light is in the off position.

Thus, when normal operating pressures from both systems are available, these pressures are ported to opposite sides of piston 12, the pressure from one of the systems being admitted to chamber 24 moves the piston 12 toward a mid position shown in FIG. 2 so that the microswitch follower 44 is located in the detent 46 of camming extension 39. The pressure in chamber 24 moves the plunger 33 to the right against the spring 38 compressing it away from the piston and consequently negating the spring force during normal operating conditions. Obviously, as the piston 12 approaches the midstroke position, namely, the null position, the switch roller enters the detent opening the switch contacts and shutting off the indicator light (not shown).

To more fully appreciated this invention, it will be appreciated that during operation, actuation will occur when a predetermined allowable difference in system pressure is exceeded, the following explanation is presented. The diameter of the pistons 26 and 28 relative to the diameter of piston 12 provides an area ratio for producing a force ratio that will produce the desired pressure differential necessary to effectuate actuation. Thus the pressure differential across piston 12 is equal to the higher pressure in the system times the area ratio of the reaction surface of the piston and the smaller piston in the chamber where the pressure is higher. Referring again to FIG. 1 and assuming that the pressure in chamber 24 has fallen off sufficiently to cause actuation of the indicator light, as shown, the force balance across the entire pressure sensor can be expressed as follows:

when:
$$A_{20} = A_{18}$$
$$P_{22}A_{18} - P_{22}A_{27} = P_{24} \times A_{20}$$

where $P$ is in pressure lbs. per square inch; (gauge) $A$ is area; and the subscript reference numerals represent the reaction face of the indicated piston.

Solving for this equation, it will be appreciated that the following is evidenced:

$$P_{22} - P_{24} = \Delta P = P_{22} \times A_{27}/A_{18}$$

For example, the system can be made to actuate when say an error of 20 percent of the system pressure is exceeded by making the area of reaction surface 27 of piston 26 equal to 20 percent of the area reaction surface 18. Obviously, this example illustrates actuation whenever the pressure in chamber 22 exceeds by 20 percent the pressure in chamber 24. As is obvious, the converse is true, namely, that the actuator will move leftwardly when pressure 24 is 20 percent greater than the pressure in chamber 22. In this instance, instead of the switch roller 44 riding on the cam surface on the left of detent 46, it will ride on the cam surface to the right of detent 46.

As is noted from FIG. 2 when normal operating pressures from both systems are available, smaller pistons 26 and 28 are spaced away from the larger diameter piston 12 toward the end restraining mechanism on connecting rod 16 and the smaller pistons will be spaced between the end restraining mechanism. In this position it is obvious that the total force in the system is manifested by the pressure acting on the reaction faces 18 and 20 of piston 12 and that the force evidenced by the pressure acting on the reaction faces of pistons 26 and 28 will be reacted by casing 10 and have no effect on piston 12. Thus, the force balance of the system is as follows:

since $A_{18} = A_{20}$ and $P_{22} = P_{24}$, the system forces can be written as follows:

$$F_{22} = P_{22}A_{18}, F_{24} = P_{24}A_{20}$$

therefore, $F_{22} = F_{24}$

In this condition the pressure loads on pistons 26 and 28 are reacted by the housing and there will be a gap between the end restraint at either end of connecting rod 16 and pistons 26 and 28 when in the maximum extended position. To accommodate normal system pressure fluctuations without generating a momentary fault signal, the system is designed to include a built-in tolerance for normal pressure imbalance between $P_{22}$ and $P_{24}$. Therefore, whenever the pressure in either chamber 22 or 24 fluctuates to incur a normal pressure fluctuation, i.e., more than the prescribed 20 percent differential, the smaller diameter piston in the chamber in which the fluctuation occurs will have to move a slight distance before it contact the end restraining mechanism. It is only until it bears against the end restraining mechanism that it subtracts a force from piston 12. Since the area ratio is correctly chosen with respect to the normal pressure fluctuation, the amount of the fluctuation is selected so that piston 12 will remain in the midstroke position without energizing the indicator light.

What has been shown by the present invention is a pressure actuator capable of producing an output signal whenever a predetermined pressure differential between two sensed pressure systems is exceeded and whenever the absence of pressure in both systems is evidenced.

It should be understood that the invention is not limited to the particular embodiments shown and described herein, but that various changes and modifications may be made without departing from the spirit or scope of this novel concept as defined by the following claims.

We claim:

1. A pressure sensor for producing an output signal indicative of a predetermined pressure differential between two pressure sources intended to be sensed comprising in combination:
   a housing defining a cavity,
   a piston in said cavity and means for admitting pressure from said two pressure sources into said cavity so that one of said pressures acts on one side of said piston and the other of said pressures acts on the other side of said piston,
   an elongated shaft extending axially from opposing sides of said piston,
   end restraining means at the ends of said elongated shaft,
   a pair of equally sized diameter slidable pistons smaller in diameter than said piston mounted on each end of said elongated shaft each having one of its faces subjected to said sensed pressure and movable within the confines of the piston and end restraining means, and
   means other than said piston for absorbing the load produced by one of said sliding pistons when the other of said sliding pistons is imposing a load on said piston.

2. A pressure sensor as claimed in claim 1 including means for urging said piston in a given direction when said cavity is void of pressures from both of said two pressure sources.

3. A pressure sensor as claimed in claim 2 including a plunger mounted at one end of said cavity, resilient means urging said plunger in a given direction, said plunger having a face exposed to the pressure in said cavity for urging said resilient means in its energy absorbing position.

4. A pressure sensor as claimed in claim 3 wherein said resilient means is a coil spring having one end bearing against an inner wall formed in said casing and the other end engaging an end face of said plunger, the pressure in said cavity compressing said spring whereby the absence of said pressure permits said spring to expand to urge said plunger against said piston for translating it in a given position.

5. A pressure sensor as claimed in claim 1 wherein the diameters of said piston and said sliding pistons are so dimensioned to produce an area ratio between said piston and one of said sliding pistons indicative of the pressure differential at which said piston translates.

6. A pressure sensor for producing an output signal indicative of a predetermined pressure differential between two pressure sources intended to be sensed comprising in combination:
   a housing defining a cavity,
   a piston in said cavity and openings in said casing communicating with said cavity for admitting pressure from said two pressure sources into said cavity so that one of said pressures acts on one face of said piston and the other of said pressures acts on the other face of said piston for translating said piston in two axial directions,
   an elongated shaft extending axially from opposing faces of said piston,
   camming means at one end of said elongated shaft having a cam portion dimensioned smaller than an opening in said casing but larger than the diameter of said elongated shaft,
   a first slidable piston smaller in diameter than said piston slidably mounted on one end of said elongated shaft having a face subjected to said sensed pressure and movable within the confines of the piston and said camming means,
   an end nut on the other end of said elongated shaft dimensioned smaller than an opening in said casing but larger than the diameter of said elongated shaft,
   a second slidable piston equal in diameter to said first slidable piston slidably mounted on the other end of said elongated shaft having one of its faces subjected to the other sensed pressure and movable within the confines of said piston and said end nut, and
   means on said casing engageable with said slidable piston to absorb the load produced by said slidable piston when the other of said slidable pistons bears against said end nut or the other of said slidable pistons bears against said camming means.

7. A pressure sensor as claimed in claim 5 including a follower bearing against said cam surface, a switch connected to said follower, said switch being actuated when said cam translated by said piston is in a given position.

* * * * *